United States Patent
Liang et al.

(10) Patent No.: US 9,853,702 B1
(45) Date of Patent: Dec. 26, 2017

(54) METHODS FOR CHANNEL ESTIMATION IN OFDMA BASED HYBRID BEAMFORMING (HBF) SYSTEMS

(71) Applicant: Keysight Technologies, Inc., Minneapolis, MN (US)

(72) Inventors: Yi Liang, Beijing (CN); Zhou Deng, Beijing (CN)

(73) Assignee: Keysight Technologies, Inc., Santa Rosa, CA (US)

( * ) Notice: Subject to any disclaimer, the term of this patent is extended or adjusted under 35 U.S.C. 154(b) by 0 days.

(21) Appl. No.: 14/995,029

(22) Filed: Jan. 13, 2016

(51) Int. Cl.
H04B 7/02 (2017.01)
H04L 1/02 (2006.01)
H04B 7/0456 (2017.01)
H04L 5/00 (2006.01)

(52) U.S. Cl.
CPC ......... H04B 7/0456 (2013.01); H04L 5/0007 (2013.01)

(58) Field of Classification Search
None
See application file for complete search history.

(56) References Cited

U.S. PATENT DOCUMENTS

| | | | | |
|---|---|---|---|---|
| 2013/0045690 A1* | 2/2013 | Seol | ...................... | H04B 7/0417 455/63.4 |
| 2014/0210666 A1* | 7/2014 | Maltsev | ................. | H01Q 25/00 342/368 |
| 2015/0139292 A1* | 5/2015 | Shirani-Mehr | ....... | H04L 5/0085 375/227 |
| 2016/0344463 A1* | 11/2016 | Kim | ..................... | H04B 7/0456 |

* cited by examiner

*Primary Examiner* — Shuwang Liu
*Assistant Examiner* — Gina McKie (57) ABSTRACT

The method is for channel estimation with transmitter (Tx) and receiver (Rx) beam training in an OFDMA HBF system wherein the transmitter and receiver communicate over a channel and each include a plurality of Radio Frequency (RF) chains and an antenna array of antenna elements corresponding to each RF chain, and wherein the transmitter includes an analog beamformer and the receiver includes an analog combiner. The method includes generating a set of orthogonal Tx training beams for the transmitter based upon a number of antenna elements in the transmitter antenna array, and generating a set of orthogonal Rx training beams for the receiver based upon a number of antenna elements in the receiver antenna array. The method includes probing the channel by simultaneously transmitting OFDMA preambles with each RF chain using a different one of the orthogonal Tx training beams and receiving the OFDMA preambles with each of the orthogonal Rx training beams in a scheduling sequence that includes a pairing of each orthogonal Tx training beam with each orthogonal Rx training beam, and performing channel estimation based upon probing feedback results including a channel response between different pairs of the orthogonal Tx training beams and the orthogonal Rx training beams.

22 Claims, 4 Drawing Sheets

METHODS FOR CHANNEL ESTIMATION IN OFDMA BASED HYBRID BEAMFORMING (HBF) SYSTEMS

BACKGROUND

The development trend of wireless communication systems is toward higher data rates to satisfy ever increasing demands for wireless data traffic. For example, wireless communication systems are being developed toward increased spectral efficiency based on communication schemes such as Orthogonal Frequency Division Multiple Access (OFDMA), Multiple Input Multiple Output (MIMO), and the like in order to increase data rates.

OFDMA is a multi-user version of the popular orthogonal frequency-division multiplexing (OFDM) digital modulation scheme. Multiple access is achieved in OFDMA by assigning subsets of subcarriers to individual users. This allows simultaneous low data rate transmission from several users.

As demands for traffic have accelerated due to increased demands for smartphones and tablets and the resulting rapid growth of applications requiring a large amount of traffic, it is difficult to satisfy the increasing demands for wireless data simply by increasing spectral efficiency. Recent interest has focused on a millimeter-wave (mmWave) wireless communication system.

Communication over mmWave frequencies may be the frontier for commercial wireless communication systems. Initial applications of mmWave to personal area networks (PAN) and local area networks (LAN) through the 60 GHz unlicensed band are already standardized and commercially available. The large bandwidths available at mmWave carrier frequencies also make it appealing for 5G cellular systems.

MmWave communication requires very large MIMO systems to provide sufficient antenna aperture. Unfortunately, at mmWave there are additional hardware constraints that have to imposed due to the practical limitations on the cost, complexity and power consumption with the current technology. Due to mixed signal and baseband processing requirements, it may not be feasible to use one complete RF chain and one DAC or ADC per antenna, so precoding and combining can not be done entirely in the baseband. For this reason, systems like IEEE 802.11ad use analog beamforming/combining and only support single stream MIMO communication. Generalizing to larger numbers of streams requires the use of precoding and combining, making functions like low complexity and low overhead channel estimation more essential.

In previous work, a hybrid architecture that accounts for hardware constraints has been proposed resulting in precoder/combiner design algorithms that divide the optimization process into the RF and the baseband stages, and channel estimation methods that exploit the sparse nature of the mmWave channel. This architecture is based on quantized phase shifters.

When wireless communication is provided in a mmWave frequency band, propagation loss, such as path loss and reflection loss, is increased in view of the spectral nature of the mmWave frequency band and the resulting shortened propagation distance reduces service coverage. Therefore, the mmWave wireless communication system may expand service coverage by mitigating the path loss of waves using beamforming and thus increasing the propagation distance of the waves.

The two types of beamforming schemes are digital beamforming (or Transmit (Tx) pre-Inverse Fast Fourier Transform (pre-IFFT) beamforming/Receive (Rx) post-Fast Fourier Transform (post-FFT) beamforming) and analog beamforming (or Tx post-IFFT beamforming/Rx pre-FFT beamforming). Digital beamforming uses a plurality of Radio Frequency (RF) paths based on Multiple Input Multiple Output (MIMO) and a digital precoder or codebook in the digital domain, and analog beamforming uses a plurality of analog/RF devices (e.g., a phase shifter, a Power Amplifier (PA), and a Variable Gain Amplifier (VGA)) and an antenna configuration. While digital beamforming requires an expensive Digital to Analog Converter (DAC) or Analog to Digital Converter (ADC) and increases implementation complexity in order to increase a beamforming gain, analog beamforming has limitations in terms of efficient use of frequency resources or maximization of beamforming performance.

Since a wavelength is shortened in a mmWave band, analog beamforming using an antenna array with a number of antenna elements arranged in a small space, such as a Uniform Linear Array (ULA) or a Uniform Planar Array (UPA), is suitable. However, the analog beamforming has limitations in its effectiveness in terms of efficient use of resources, the increase of user or system throughput through MIMO schemes such as Single User MIMO (SU-MIMO), Multiple User MIMO (MU-MIMO), or spatial multiplexing, and the increase of Signal to Noise Ratio (SNR) or reliability through diversity or additional digital beamforming, as described before.

For these reasons, beamforming design with a reduced number of RF chains is attractive. One approach FOR achieving this reduction is to deploy beamforming at both the digital (or frequency) domain and the analog (or time) domain, i.e., hybrid beamforming (HBF). In the digital domain, beamforming can be realized using microprocessors whereas, in the analog domain, beamforming may be implemented by using low cost phase shifters.

Due to the architecture of hybrid beamforming, the signals from each antenna element are not available in baseband unit, which leads to the difficulty of beam training since beam training algorithms are typically conducted in baseband. The beam training approaches may be quite different and should be carefully designed for training the optimal transmit Tx beams and receive Rx beams.

The combination of OFDMA and hybrid beamforming include a difficulty in that the analog beamformer in the transmitter and the analog combiner in the receiver would be applied in the time domain which is very different from the conventional OFDMA architecture (such as LTE/LTE-A). An OFDMA-based LTE/LTE-A system applies digital precoding in baseband and the analog elements are not involved in energy-directive conducting. So, to receive the signal correctly, the analog beamformer in the transmitter and the analog combiner in the receiver need to be adjusted prior to the data transmission.

So, a practical beam training approach for channel estimation in OFDMA-based HBF systems may be needed.

SUMMARY

According to various embodiments, a beam training approach is provided for channel estimation in OFDMA-based HBF systems. Also, according to various embodiments, methods are provided for channel estimation in an OFDMA HBF wireless communication system, and for operating an OFDMA HBF wireless communication system.

In accordance with a representative embodiment, a method is provided for channel estimation with transmitter (Tx) and receiver (Rx) beam training in an OFDMA HBF system where the transmitter and receiver communicate over a channel and each include a plurality of Radio Frequency (RF) chains and an array of antenna elements corresponding to each RF chain, and where the transmitter includes an analog beamformer and the receiver includes an analog combiner. The method includes generating a set of orthogonal Tx training beams for the transmitter based upon a number of antenna elements in the transmitter array; generating a set of orthogonal Rx training beams for the receiver based upon a number of antenna elements in the receiver array; probing the channel by simultaneously transmitting OFDMA preambles with each RF chain using a different one of the orthogonal Tx training beams and receiving the OFDMA preambles with each of the orthogonal Rx training beams in a scheduling sequence that includes a pairing of each orthogonal Tx training beam with each orthogonal Rx training beam; and performing channel estimation based upon probing feedback results including a channel response between different pairs of the orthogonal Tx training beams and the orthogonal Rx training beams.

In certain embodiments, a number of orthogonal Tx training beams in the set may correspond to the number of antenna elements in the transmitter array, and a number of orthogonal Rx training beams in the set may correspond to the number of antenna elements in the receiver array. The set of orthogonal Tx training beams may define a Tx training beam matrix dimensioned based upon the number of antenna elements in the transmitter array, and the set of orthogonal Rx training beams may define an Rx training beam matrix dimensioned based upon the number of antenna elements in the receiver array.

In certain embodiments, each column in the Tx training beam matrix corresponds to one of the Tx training beams, and a conjugate of each column in the Rx training beam matrix corresponds to one of the Rx training beams.

In certain embodiments, simultaneously transmitting OFDMA preambles with each RF chain includes multiplexing the OFDMA preambles in the frequency domain.

In certain embodiments, a number $N_{ofdm}$ of OFDMA preambles transmitted is based upon the number $N_t$ of antenna elements in the transmitter array, a number $N_{trf}$ of RF chains in the transmitter, the number $N_r$ of antenna elements in the receiver array, and a number $N_{rrf}$ of RF chains in the receiver according to the equation $N_{ofdm}=N_t/N_{trf}*N_r/N_{rrf}$.

In certain embodiments, performing channel estimation based upon probing feedback results comprises obtaining channel estimations for each subcarrier of OFDMA transmission blocks.

The OFDMA HBF system may be a massive multiple input multiple output (MIMO) OFDMA HBF system. Also, the transmitter and receiver of the MIMO OFDMA HBF system may communicate using millimeter wave (mmWave) wireless communications. Communication on other frequency bands is also contemplated.

Another embodiment is directed to a method of operating an OFDMA HBF system wherein a transmitter and receiver communicate over a channel and each include a plurality of RF chains and an array of antenna elements corresponding to each RF chain, and wherein the transmitter includes an analog beamformer and the receiver includes an analog combiner. The method includes generating a set of orthogonal Tx training beams for the transmitter based upon a number of antenna elements in the transmitter array; generating a set of orthogonal Rx training beams for the receiver based upon a number of antenna elements in the receiver array; probing the channel by simultaneously transmitting OFDMA preambles with each RF chain using a different one of the orthogonal Tx training beams and receiving the OFDMA preambles with each of the orthogonal Rx training beams in a scheduling sequence that includes a pairing of each orthogonal Tx training beam with each orthogonal Rx training beam; performing channel estimation based upon probing feedback results including a channel response between different pairs of the orthogonal Tx training beams and the orthogonal Rx training beams; and adjusting transmit beams in the analog beamformer of the transmitter and receive beams in the analog combiner of the receiver based upon the channel estimation.

Another embodiment is directed to a wireless communications device for operation in an OFDMA HBF system. The wireless communications device includes a transmitter including a digital precoder, a plurality of Radio Frequency (RF) chains, an analog beamformer and an array of antenna elements corresponding to each RF chain, and configured to communicate over a channel with a receiver that includes a plurality of RF chains, an array of antenna elements corresponding to each RF chain, an analog combiner and a digital decoder. A controller including one or more integrated circuit devices is configured to: generate a set of orthogonal Tx training beams for the transmitter based upon a number of antenna elements in the transmitter array for reception at the receiver via a set of orthogonal Rx training beams that are based upon a number of antenna elements in the receiver array; probe the channel by controlling the transmitter to simultaneously transmit OFDMA preambles with each RF chain using a different one of the orthogonal Tx training beams for reception of the OFDMA preambles with each of the orthogonal Rx training beams in a scheduling sequence that includes a pairing of each orthogonal Tx training beam with each orthogonal Rx training beam; and adjust transmit beams in the analog beamformer of the transmitter in view of channel estimation information from the receiver based upon probing feedback results including a channel response between different pairs of the orthogonal Tx training beams and the orthogonal Rx training beams.

BRIEF DESCRIPTION OF THE DRAWINGS

The example embodiments are best understood from the following detailed description when read with the accompanying drawing figures. It is emphasized that the various features are not necessarily drawn to scale. In fact, the dimensions may be arbitrarily increased or decreased for clarity of discussion. Wherever applicable and practical, like reference numerals refer to like elements.

DETAILED DESCRIPTION

In the following detailed description, for purposes of explanation and not limitation, example embodiments disclosing specific details are set forth in order to provide a thorough understanding of an embodiment according to the present teachings. However, it will be apparent to one having ordinary skill in the art having the benefit of the present disclosure that other embodiments according to the present teachings that depart from the specific details disclosed herein remain within the scope of the appended claims. Moreover, descriptions of well-known apparatuses and methods may be omitted so as to not obscure the description of the example embodiments. Such methods and apparatuses are clearly within the scope of the present teachings.

The terminology used herein is for purposes of describing particular embodiments only, and is not intended to be limiting. The defined terms are in addition to the technical and scientific meanings of the defined terms as commonly understood and accepted in the technical field of the present teachings.

As used in the specification and appended claims, the terms 'a', 'an' and 'the' include both singular and plural referents, unless the context clearly dictates otherwise. Thus, for example, 'a device' includes one device and plural devices.

Relative terms may be used to describe the various elements' relationships to one another, as illustrated in the accompanying drawings. These relative terms are intended to encompass different orientations of the device and/or elements in addition to the orientation depicted in the drawings.

It will be understood that when an element is referred to as being "connected to" or "coupled to" another element, it can be directly connected or coupled, or intervening elements may be present.

Initially, transmit (Tx) beamforming increases directivity by focusing signal waves in a specific direction through a plurality of antennas. A set of antennas may be referred to as an antenna array and the individual antennas of the antenna array may be referred to as antenna elements. The antenna array may take various forms including a linear array, a planar array, etc., for example. Tx beamforming may increase a propagation distance by increasing signal directivity. Since signals are transmitted in a specific direction, Tx beamforming may also reduce signal interference with users other than an intended user.

A receiver may also perform Receive (Rx) beamforming using an Rx antenna array. Since Rx beamforming increases the reception sensitivity of signals from a specific direction by focusing signal reception in the specific direction, excluding signals from the other directions, Rx beamforming may block signals causing interference.

The embodiments below are described while referring to the millimeter wave (mmWave) band which is the band of spectrum between 30 gigahertz (Ghz) and 300 Ghz. 5G wireless broadband technology is being tested on mmWave spectrum. However, the present embodiments are not limited thereto as wireless communications on other bands is also contemplated, for example, microwave and radio wave frequency bands.

A millimeter wave (mmWave) wireless mobile communication system uses beamforming to mitigate high propagation path loss in a mmWave frequency band. A beamforming process is suggested by, for example, the Institute of Electrical and Electronics Engineers (IEEE) 802.11ad standard which is a Wireless Local Area Network (WLAN) standard that provides a very small service area with a radius of 10 to 20 meters in the 60-GHz millimeter-wave band. The IEEE 802.11ad standard includes two phases: Sector Level Sweep (SLS) and Beam Refinement Protocol (BRP).

To overcome a wave propagation problem encountered with the mmWave band, beamforming is used. During the SLS phase, a station that will perform beamforming transmits the same sector frame repeatedly in different directions and a peer station receives sector frames through quasi-omni antennas and transmits feedback regarding a direction having the highest sensitivity. Therefore, the station may perform beamforming by acquiring information about the direction having the highest sensitivity from the peer station.

During the BRP phase, Tx and Rx beam directions between the two stations are fine-adjusted after the SLS phase in order to increase Tx and Rx beamforming gains. Typically, after the two stations detect the best Tx beam during the SLS phase, they search for the best Rx beam matching the best Tx beam during the BRP phase. Additionally, the Tx-Rx beam pair may be further fine-adjusted by repeating the SLS and BRP phases.

Hybrid beamforming applicable to a cellular communication system according to an exemplary embodiment of the present invention combines analog beamforming that overcomes path loss by high-gain beamforming at an RF end with digital precoding that maximizes capacity via a MIMO architecture.

An analog and digital hybrid beamforming structure for transmission and reception between a base station and a mobile station selects one or more best beams from one or more analog beam sets having directivity on downlink and uplink and performs beamforming efficiently using the selected beams in combination. Therefore, a large propagation loss in the mmWave band is mitigated.

For this purpose, a hybrid beamforming approach is selected in an exemplary embodiment of the present invention. A base station transmits beam training signals in multi-directional beams that cover beam spaces. The mobile station receives the training signals via beam space sweeping and reports information about the training beams to the base station.

In an exemplary embodiments described below, a beam spatial channel matrix (or an effective channel matrix) is estimated and made up of beamforming coefficients for the selected analog Tx and Rx beams. The precoding and subsequent combining are then based on the beam spatial channel matrix.

The analog beamformer at the back ends of the DACs may include a plurality of frequency converters or mixers, a plurality of phase shifters, and a plurality of Power Amplifiers (PAs) or Variable Gain Amplifiers (VGAs) corresponding to the respective RF paths and forms beams to be transmitted in a specific direction by controlling the phases and amplitudes of signals input to a plurality of antenna elements in the RF paths. The beams are transmitted through an antenna array that is formed by grouping a plurality of antenna elements to increase a beamforming gain.

One or more beams having different beam widths and beam gains that are generated from the hybrid beamforming structure may be used in different manners according to the channel characteristics of a reference signal, a data channel, and/or a control channel, the mobility and channel characteristics of a mobile station, uplink/downlink, or transmission/reception. A selected beam is formed by controlling the beamforming coefficient of an analog or digital end so that the beam has a specific beamwidth and beam gain in a specific direction.

Figure 1:
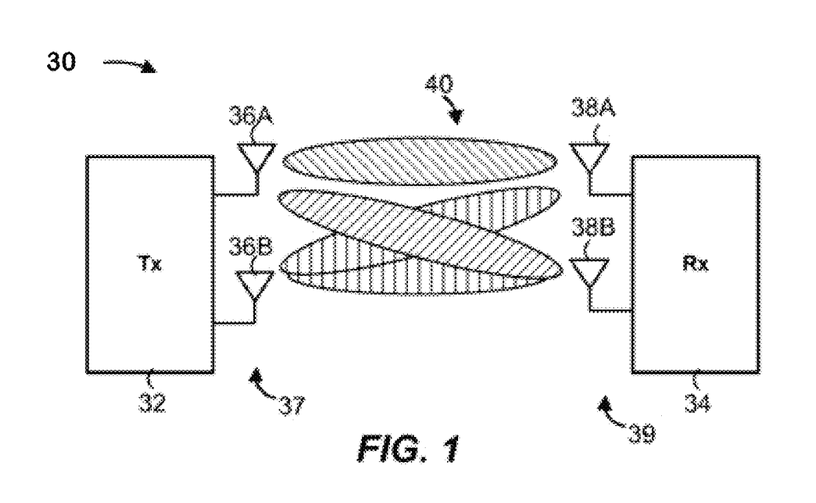
FIG. 1 is a block diagram that illustrates a beamforming wireless communication network.

Some basics of a beamforming system will now be described with reference to FIG. 1. FIG. 1 is a block diagram of an example of a communication system that has beamforming capabilities. For simplicity, FIG. 1 illustrates a system in which only two devices are communicating with each other. However, as described further below, a system can also include more than two devices, and one device can communicate with several other devices. In any event, FIG. 1 illustrates a wireless communication system 30 in which a station or transmitting device 32 transmits information over a wireless communication channel to another station or receiving device 34. In an embodiment, the transmitted information is in the form of one or more data units (e.g. packets, frames, etc). Each of the devices 32 and 34 is, for example, a fixed station, such as a base station, personal computer, etc., or a mobile station such as a mobile phone, a personal digital assistant, etc. In the example of FIG. 1, the transmitting device 12 is equipped with two or more antennas 36A and 36B defining an antenna array 37, while the receiving device 34 is equipped with two or more antennas 38A and 38B defining antenna array 39. The wireless communication system 30 is thus a multiple input, multiple output (MIMO) system. For the purposes of simplicity and conciseness, the transmitting device 32 and receiving device 34 is illustrated with only two antennas. However, it will be noted that they can generally have any desired number of antennas or antenna arrays with a number of antenna elements arranged in a small space, such as a ULA or a UPA.

Each of the transmitter 32 and the receiver 34 can apply steering vectors to the respective antenna array 36 or 38 to define gain patterns 40. During transmission, the transmitting device 32 controls the phase and/or amplitude of a signal at each of the antennas 36A and 36B to define a radiation or gain pattern 40. Specifically with respect to controlling phases, the transmitting device 32 selects a steering vector (or "phasor") that specifies a set of phase shifting angles, and applies the steering vector to the antenna array 37 to thereby define a phased antenna array. For example, the steering vector can specify a 0° phase shift for the antenna 36A and a 35° phase shift for the antenna 36B. In this manner, the steering vector defines a direction of transmission or reception of the antenna array 37 that may be referred to as a "sector."

Generally, a station equipped with multiple antennas and operating in a MIMO environment may use a transmit steering vector to define a gain pattern when transmitting outbound data and a receive steering vector to define a gain pattern when receiving inbound data. By extension, when a pair of multi-antenna devices (e.g., devices 32 and 34) exchange data in both directions, these devices may define multiple steering vectors.

The narrowband transmission model:

$$\hat{s}=W_{BB}{}^H W_{RF}{}^H H F_{RF} F_{BB} s + W_{BB}{}^H W_{RF}{}^H n$$

Where,
Ŝ is the equalized symbols in the receiver, Ns-by-1;
S represents symbols to be transmitted, Ns-by-1;
H is channel information, Nr-by-Nt;
n is the noise, Nr-by-1;
$F_{BB}$ represents the digital precoder, Ntrf-by-Ns;
$F_{RF}$ represents the analog beamformer, Nt-by-Ntrf;
$W_{BB}$ represents the digital MIMO decoder, Nrrf-by-Ns; and
$W_{RF}$ represents the analog combiner, Nt-by-Ntrf.

Figure 2:
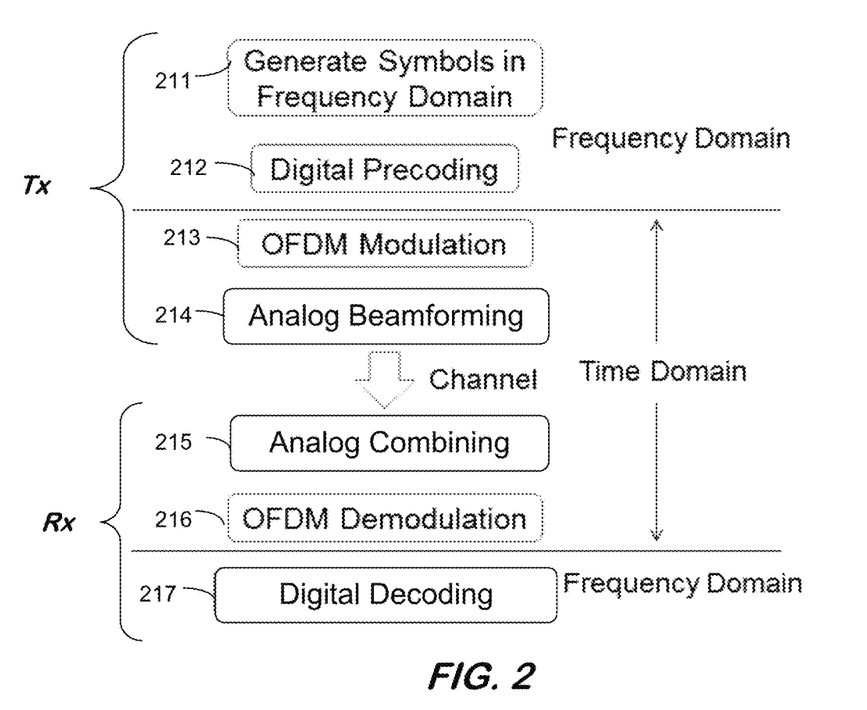
FIG. 2 is a schematic diagram that illustrates processes involved in operation of an OFDMA HBF system in accordance with a representative embodiment.

In narrowband HBF systems, the process for beam training may be known, but in an OFDMA-based wideband systems, the process is more complex. With reference to FIG. 2, symbols are generated in operation 211 and digital precoding 212 are performed in the frequency domain. After the generation of symbols, OFDM modulation in operation 213 and analog beamforming in operation 214 are performed in the time domain, and the OFDM modulated signals are transmitted through a channel to the receiver. The received OFDM modulated signals are combined via analog combining in operation 215 and the combined OFDM signals are demodulated in operation 216, also in the time domain. Thus, the digital MIMO decoding is performed in operation 217 in the frequency domain. Complexity arises since digital precoding and digital demodulation are in the frequency domain, but analog beamforming and analog combination are in the time domain. The HBF procedure makes it more complex when multiple users are taken into account.

As can be seen, in an OFDMA system, different users multiplexed in the frequency domain experience the same analog beamformer in the transmitter. So, a difficulty of an OFDMA HBF system is how to get sufficient or optimal Tx/Rx beams as common beamformers/combiners for all users. The present approach herein focuses on addressing or resolving the above-mentioned issue.

The purpose of channel estimation in an OFDMA HBF is to obtain the appropriate $F_{RF}$ and $W_{RF}$ applied in the time domain, and obtain $F_{BB}$ and $W_{BB}$ in the frequency domain. So, there are two parts to the channel estimation including the estimation of the RF parts ($F_{RF}$ and $W_{RF}$) and the estimation of the digital parts ($F_{BB}$ and $W_{BB}$). Upon estimation of $F_{RF}$ and $W_{RF}$, the digital parts can only see the effective channel $H = F_{RF}{}^H$ and $W_{RF}{}^H$, so typical MIMO estimation processes are applicable here upon the effective channel. However, the estimation process and mechanism for $F_{RF}$ and $W_{RF}$ should be carefully designed due to the HBF architecture.

Figure 3:
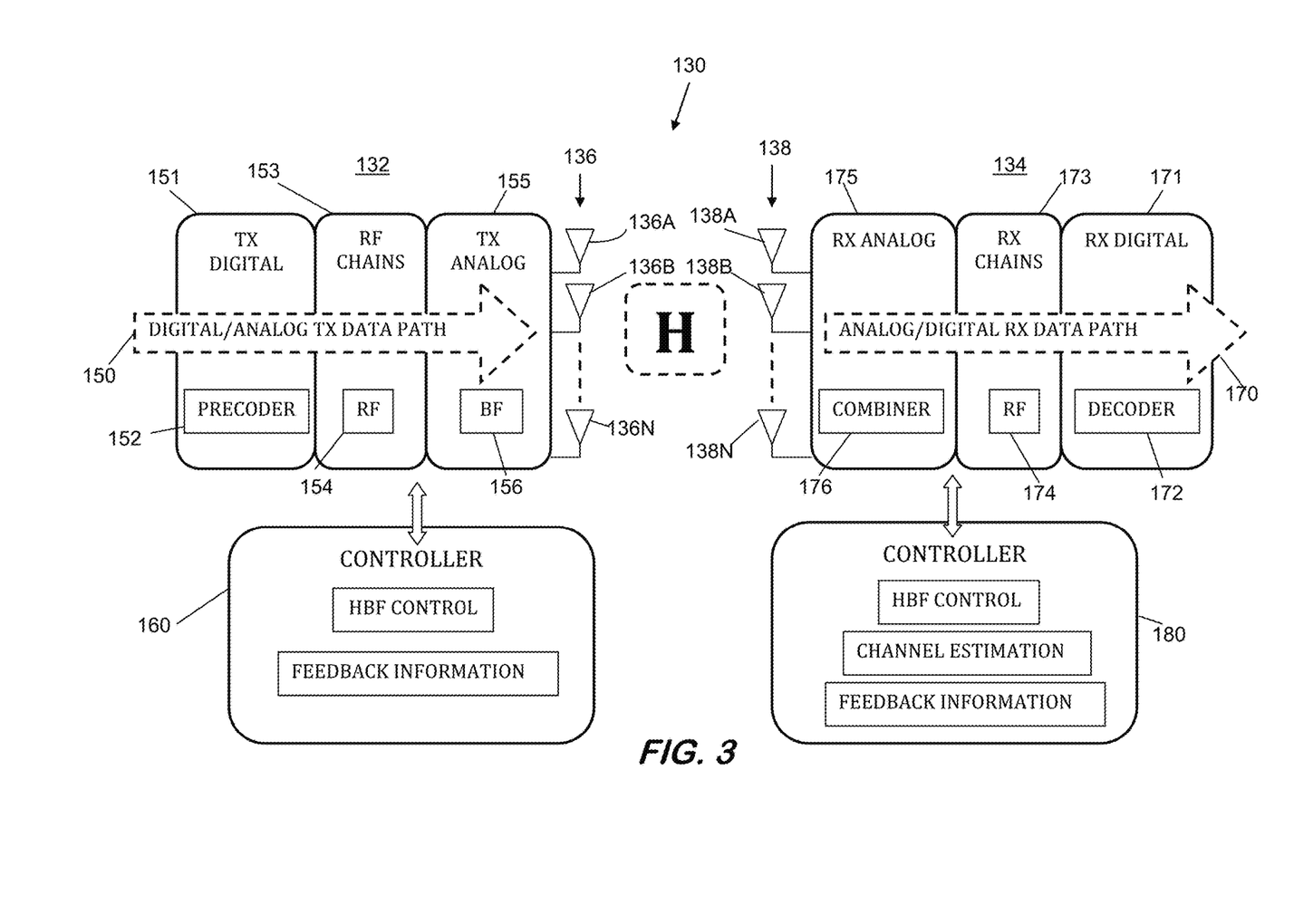
FIG. 3 is a block diagram that illustrates an OFDMA HBF system in accordance with a representative embodiment.

An OFDMA HBF system 130 will be described with reference to FIG. 3 which illustrates an example of a wireless network. The embodiment of the OFDMA HBF system 130 in the wireless network shown in FIG. 3 is for illustration only. Other embodiments of the OFDMA HBF system 130 in the wireless network could be used without departing from the scope of this disclosure. For example, in some embodiments, communication in the OFDMA HBF system 130 in the wireless network may use 5G, LTE, LTE-A, WiMAX, WiFi, or other wireless communication techniques. As described below, the communication in a wireless network, such as the one shown in FIG. 1, may be an OFDM based millimeter wave communication in which the transmitter and the receiver operate at millimeter wave frequencies.

At least some of the components in FIG. 3 may be implemented in software while other components may be implemented by configurable hardware or a mixture of software and configurable hardware.

FIG. 3 is a schematic block diagram illustrating the OFDMA HBF system 130 including a transmitter Tx 132 and receiver Rx 134. It is noted that FIG. 3 illustrates an example architecture of the transmitter Tx 132 that has HBF capabilities. In such embodiment, the architecture of the transmitter 132 is similar to the architecture of the receiver 134. Of course, a device operating in a communication system such as those illustrated in FIGS. 1 and 3 typically is both a receiver and a transmitter (in respective operational states, for example). Thus, although FIGS. 1 and 3 illustrate receiver and transmitter architectures separately for the purposes of clarity, in an embodiment, a device, such as a base station or mobile station, equipped with an antenna array and adapted to communicate via a channel typically has a common transceiver architecture with components illustrated in FIGS. 2 and 3. For example, such a transceiver device may include features for both receive beamforming training and transmit beamforming training, a common beamforming controller (such as the beamforming controller) for controlling the antenna array during both receive beamforming training and transmit beamforming training, etc., as well as components specific to transmitter and receiver operations such as signal storage or feedback processing, as would be appreciated by those skilled in the art.

The transmitter Tx 132, according to an embodiment, includes an antenna array 136 coupled to a shared digital/analog transmitter data path 150. The antenna array 136 has a number $N_t$ of antenna elements 136A, 136B . . . 136N which are controllable and which may define a part of a beamforming network. The digital/analog transmit data path 150 includes some or all of such components as an equalizer, an encoder, an interleaver, a modulator, a D/A converter, a Fast Fourier Transform (FFT) processing block, etc.

The digital part 151 of the transmitter 132 at least includes a precoder 152. Precoding is a generalization of beamforming to support multi-stream (or multi-layer) transmission in multi-antenna wireless communications. In conventional single-stream beamforming, the same signal is emitted from each of the transmit antennas with appropriate weighting (phase and gain) such that the signal power is maximized at the receiver output. When the receiver has multiple antennas, single-stream beamforming cannot simultaneously maximize the signal level at all of the receive antennas. In order to maximize the throughput in multiple receive antenna systems, multi-stream transmission is generally required. Precoding may mean that multiple data streams are emitted from the transmit antennas with independent and appropriate weightings such that the link throughput is maximized at the receiver output. In multi-user MIMO, the data streams are intended for different users and some measure of the total throughput (e.g., the sum performance or max-min fairness) is maximized. Linear precoding strategies include maximum ratio transmission (MRT), zero-forcing (ZF) precoding, and transmit Wiener precoding. Nonlinear precoding is designed based on the concept of dirty paper coding (DPC).

The RF chains block 153 of the transmitter Tx 132 may include an RF chain 154 associated with a plurality of the antenna elements 136A, 136B . . . 136N. An RF chain may include a low-noise amplifier, down-converter, digital to analog converter (DAC), analog to digital converter (ADC) etc.

The large gain achieved with the multi-input multi-output (MIMO) technology comes with a cost. In particular, the multiple analog RF chains 154, may be expensive and power consuming, and are required at both the transmitter Tx 132 and receiver Rx 134 sides. On the other hand, the antenna elements 136A, 136B . . . 136N connecting to the RF chains 154 are less expensive. Hence, embodiments herein may implement more antenna elements 136A, 136B . . . 136N than RF chains 154 and to use only a subset of them based on an antenna selection (AS) algorithm.

The Tx analog block 155 of the transmitter Tx 132 includes the beamformer 156. In the digital domain, beamforming can be realized using microprocessors whereas, in the analog domain, beamforming is typically implemented by using low cost phase shifters. The phase shifters, such as delay lines, are suitable for shifting the signal provided to the corresponding antenna elements 136A, 136B . . . 136N of the array 136 by a respective phase shifting angle θ.

The transmitter Tx 132 may further include a controller 160 to control the digital block 151 and the analog beamformer 156, to acquire information needed for hybrid beamforming, to exchange the information with the receiver Rx 134, and to determine information needed to control the analog beamformer 156, for example, a beamforming coefficient matrix.

FIG. 3 also illustrates an example architecture of the receiver Rx 134 that has beamforming capabilities. The receiver includes an antenna array 138 connected to a shared analog/digital receiver data path 170. The antenna array 138 has a number $N_r$ of antenna elements including antenna elements 138A, 138B . . . 138N, for example, coupled to respective phase shifters or delay lines which are controllable and which define a beamforming network. In general, the analog/digital receive data path 170 includes some or all of such components as an equalizer, a decoder, a de-interleaver, a demodulator, an A/D converter, a Fast Fourier Transform (FFT) processing block, etc.

As shown, the Rx analog block 175 of the receiver Rx 134 includes a combiner 176 to process the received signals from antenna array 138.

The RF chains block 173 of the receiver Rx 134 may include an RF chain 174 associated with a plurality of the antenna elements 138A, 138B . . . 138N. An RF chain 174 may include a low-noise amplifier, down-converter, digital to analog converter (DAC), analog to digital converter (ADC) etc. Embodiments herein may implement more antenna elements 138A, 138B . . . 138N than RF chains 174 and to use only a subset of them based on an antenna selection (AS) algorithm.

The digital part 171 of the receiver Rx 134 includes a decoder 172. To recover each of the originally transmitted data streams from the aggregated signals that are received at each of the receive antenna elements 138A, 138B . . . 138N, the receiver uses decoder 172, such as a MIMO decoder. MIMO decoding determines how much of the transmit chain is decoded by a demodulator. The decoder 172 essentially processes the aggregated signals to extract each of the originally transmitted data streams. This extraction process is computationally intensive and involves significant amounts of matrix manipulation, such as matrix addition, subtraction, division, inversion, and the like. These computations are iterative in nature and generally need to be provided on a symbol-by-symbol basis for each of the transmitted data streams, as would be understood by those skilled in the art.

The receiver Rx 134 may further include a controller 180 to control the analog combiner 176, acquire information needed for hybrid beamforming, exchange the information with the transmitter 132, and determine information required to control the analog combiner 176, for example, a beamforming coefficient matrix. The controller 180 performs channel estimation on analog beams output from the plurality of RF paths (i.e., RF chains 174) sharing the antenna array 138 and thus may determine the best analog beam based on the channel estimation.

Generally with respect to the architecture of the receiver 134 and the transmitter 132 illustrated in FIG. 3, it will be noted that various ones of the blocks and modules illustrated therein can be implemented using hardware, software instructions executed by a processor and associated computer memory, firmware instructions executed by a processor, or combinations thereof. Moreover, some of the components may be custom integrated circuits, application-specific integration circuits (ASICs), etc., communicatively coupled by electrical busses, for example.

A 'processor' as used herein encompasses an electronic component which is able to execute a program or machine executable instruction. References to a device comprising "a processor" should be interpreted as possibly containing more than one processor or processing core. The processor may for instance be a multi-core processor. A processor may also refer to a collection of processors within a single computer system or distributed amongst multiple computer systems. Many programs have their instructions performed by multiple processors that may be within the same computing device or which may even be distributed across multiple computing devices.

'Computer memory' or 'memory' is an example of a computer-readable storage medium. Computer memory is any memory which is directly accessible to a processor. Examples of computer memory include, but are not limited to: RAM memory, registers, and register files. References to 'computer memory' or 'memory' should be interpreted as possibly being multiple memories. The memory may for instance be multiple memories within the same computer system. The memory may also be multiple memories distributed amongst multiple computer systems or computing devices.

The approach, according to the depicted embodiment, for channel estimation with transmitter Tx 132 and receiver Rx 134 beam training in an OFDMA HBF system 130 will be described.

First, the parameters related to the OFDMA HBF system 130 are defined:

$N_t$ is the number of antenna elements 136A, 136B . . . 136N in the transmitter Tx 132;

$N_{trf}$ is the number of RF chains equipped in the transmitter Tx 132;

$N_r$ is the number of antenna elements 138A, 138B . . . 138N in the receiver Rx 134;

$N_{rrf}$ is the number of RF Chains equipped in the receiver Rx 134; and $N_c$ is the number of subcarriers of the OFDMA training symbol.

For convenience of description, it is assumed that $N_t$ is an integer multiple of $N_{trf}$ and $N_r$ is an integer multiple of $N_{rrf}$. Then, a training beam set is designed or generated for transmitter Tx 132 and receiver Rx 134: $S_T$ ($N_t$-by-$N_t$ matrix) and $S_R$ ($N_r$-by-$N_r$ matrix), both of which are a unitary matrix or a scaled unitary matrix. Each training beam in the transmitter Tx 132 is the column of $S_T$ and each training beam in the receiver Rx 134 is the conjugate of the column of $S_R$. The columns are vectors or orthogonal metrics.

In the following description, for convenience, we assume both of the matrices $S_T$ ($N_t$-by-$N_t$ matrix) and $S_R$ ($N_r$-by-$N_r$ matrix), are unitary matrices.

Each column of $S_T$ ($N_t$-by-$N_t$ matrix) and $S_R$ ($N_r$-by-$N_r$ matrix) are scheduled appropriately for training the optimal Tx/Rx Beams.

The transmitter Tx 132 sends out a number $N_{ofdm}$ of OFDMA preambles or symbols to train the desired or optimal beams. The number $N_{ofdm}$ of OFDMA preambles transmitted may be based upon the number $N_t$ of antenna elements 136A, 136B . . . 136N in the transmitter antenna array 136, a number $N_{trf}$ of RF chains 154 in the transmitter 132, the number $N_r$ of antenna elements 138A, 138B . . . 138N in the receiver antenna array 134, and a number $N_{rrf}$ of RF chains 174 in the receiver Rx 134, for example, according to the equation $N_{ofdm}=N_t/N_{trf}*N_r/N_{rrf}$.

The OFDMA preamble or symbol transmitted in each OFDMA time instant and each RF chain 154 are pre-defined. With additional reference to FIG. 4, details of an example of the present approach will be described. Of course, the number of antenna elements and RF chains etc. are for ease of explanation and in no way limiting regarding the present approach.

Figure 4:
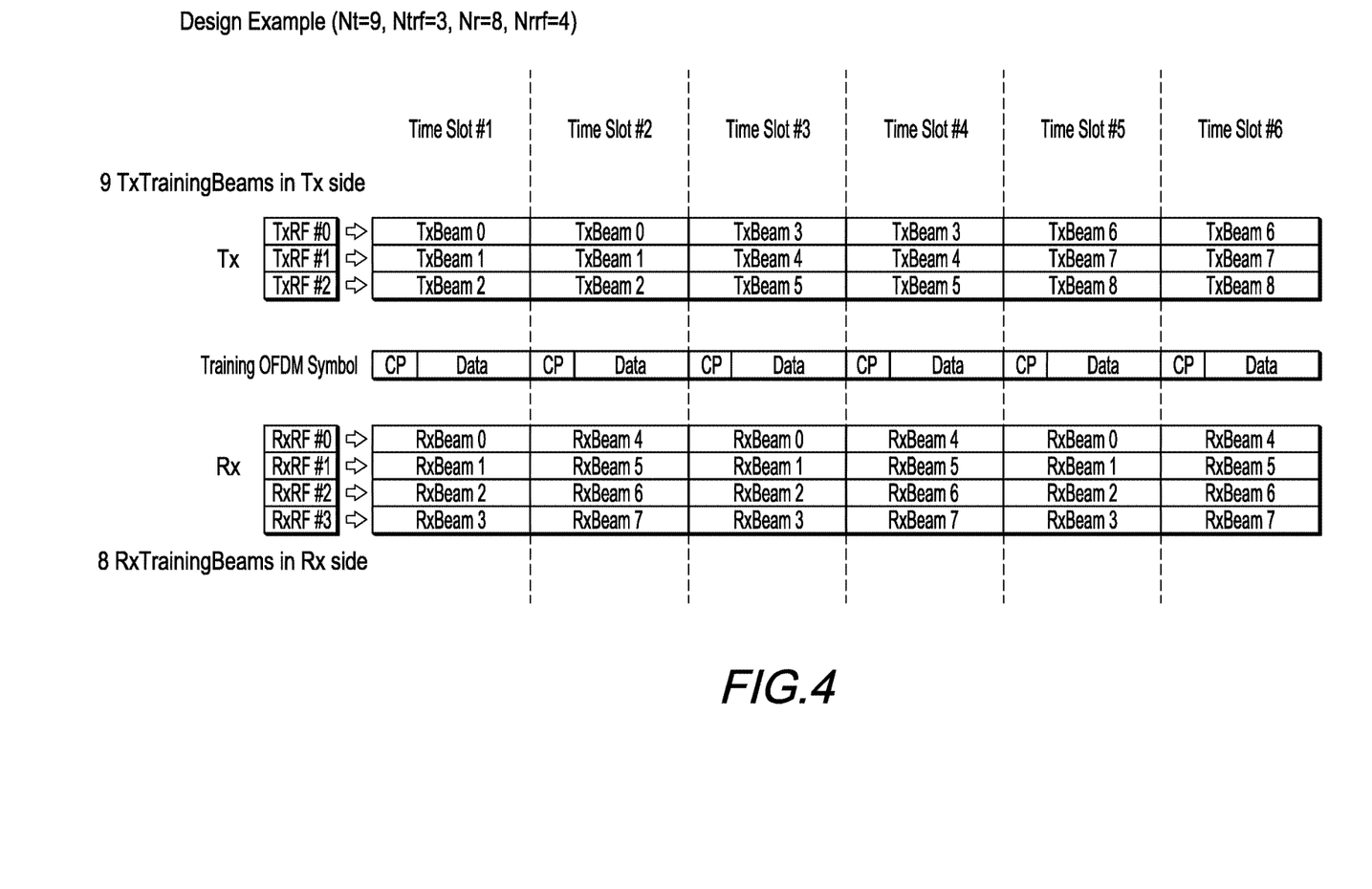
FIG. 4 is a diagram that illustrates an example of the beam training approach in the OFDMA HBF system of FIG. 3.

In the example, $N_t=9$, $N_{trf}=3$, $N_r=8$, $N_{rrf}=8$, so 6 time slots are needed to complete the training process, in which each time slot contains an OFDMA training symbol. The Tx/Rx training beams are scheduled to make sure all links between each column of $S_T$ ($N_t$-by-$N_t$ matrix) and each column of $S_R$ ($N_r$-by-$N_r$ matrix) are covered. In the example of FIG. 4, during each time slot, the three Tx RF chains transmit OFDMA symbols with different Tx training beams and the Rx side receives the signal via four orthogonal Rx training beams.

From the illustration in FIG. 4, OFDMA training symbols from different Tx RF chains 154 are sent out simultaneously, and to separate the OFDM training symbols from different Tx RF chains 154 in the receiver Rx 134, the OFDM training symbols are multiplexed in the frequency domain, for example with code division multiple access (CDMA).

So, at the receiver 132, the RF chains 174 receive OFDMA training symbols from the pre-defined Rx training beams simultaneously.

The resource allocation of subcarriers for OFDMA symbols transmitted in each RF chain 154, in an embodiment, results in OFDMA symbols transmitted in an RF chain 154 of the transmitter Tx 132 only occupying the subcarriers allocated to that RF chain 154, for example, TxRF #0 in the example illustrated in FIG. 4.

Due to the multiplexing, the channel response is obtained (by the conventional channel estimation) between different pairs of Tx training beams and Rx training beams. After the training process, the following intermediate probing matrix can be obtained for many interesting subcarriers (e.g. the specific subcarrier index depends on the number of overall subcarriers and specific antenna array and RF chains configuration):

$$H_{Intermediate}=S_R^H H S_T$$

Where, H is the channel estimation with dimension Nr-by-Nt. Since, both $S_T$ and $S_R$ are unitary matrices, the real channel for each subcarrier can be obtained using:

$$\hat{H}=S_R H_{Intermediate} S_T^H$$

Once the channel estimation is obtained in different subcarriers, they are integrated to get a common transmitting signal space and receiving signal space for a final analog beamformer/combiner.

Given there are K available channel estimation matrices in K subcarriers represented as $\hat{H}_k$, the optimal transmitting/receiving signal space can be calculated for each $\hat{H}_k$, using various algorithms, such as Singular Value Decomposition (SVD) or QR.

Using SVD herein:

$$\hat{H}_k=U_k D_k V_k^H$$

It is noted that in single-user (SU)-Beamforming scenario, although frequency-selective fadings exist along the whole bandwidth, the directivity information is kept the same in different frequency points or subcarriers and in a multi-user (MU)-Beamforming scenario, the directivity information of different users may be different. So integrating estimated channel information together is important, since common analog beamformers/combiners would be used for the whole bandwidth and for different users.

Next, each subcarrier's contribution to the final Tx space and Rx space can be determined based upon certain criterion. Here, assuming $p_k$ columns corresponding to the $p_k$ largest singular values are selected for each available subcarrier. And the weighting matrix for constructing the final space is defined as $G_k$, which is a diagonal matrix.

Taking the transmitting space as example, the final Tx space is constructed:

$$TxSpace=[V_1(:,1:p_1)G_k, V_2(:,1:p_1)G_2, \ldots, V_k(:,1:p_k)$$
$$Gk, \ldots V_k(:,1:p_k)G_k]$$

Then, various orthogonal matching pursuit methods can be used to obtain the analog beamformer $F_{RF}$ and analog combiner $W_{RF}$. Both $F_{RF}$ and $W_{RF}$ can be obtained using similar procedures. Taking $F_{RF}$ as an example here, an example of a method is set forth below.

Calculation of $F_{RF}$:
Step 1: $F_{RF}$=Empty Matrix
Step 2: $F_{res}$=TxSpace Step 3: For $i \leq N_{trf}$ do $$\Psi = A_t^H F_{res}$$

$$k = \max_l (\Psi\Psi^H)_{l,l}$$

$$F_{RF} = \lfloor F_{RF} \mid A_t^k \rfloor$$

$$F_{BB} = (F_{RF}^H F_{RF})^{-1} F_{RF}^H V_{overall}$$

$$F_{res} = \frac{V_{overall} - F_{RF}F_{BB}}{\|V_{overall} - F_{RF}F_{BB}\|_F}$$

End For

Step 4: Return $F_{RF}$

Where $A_t$ is the available beams for Tx.

Figure 5:
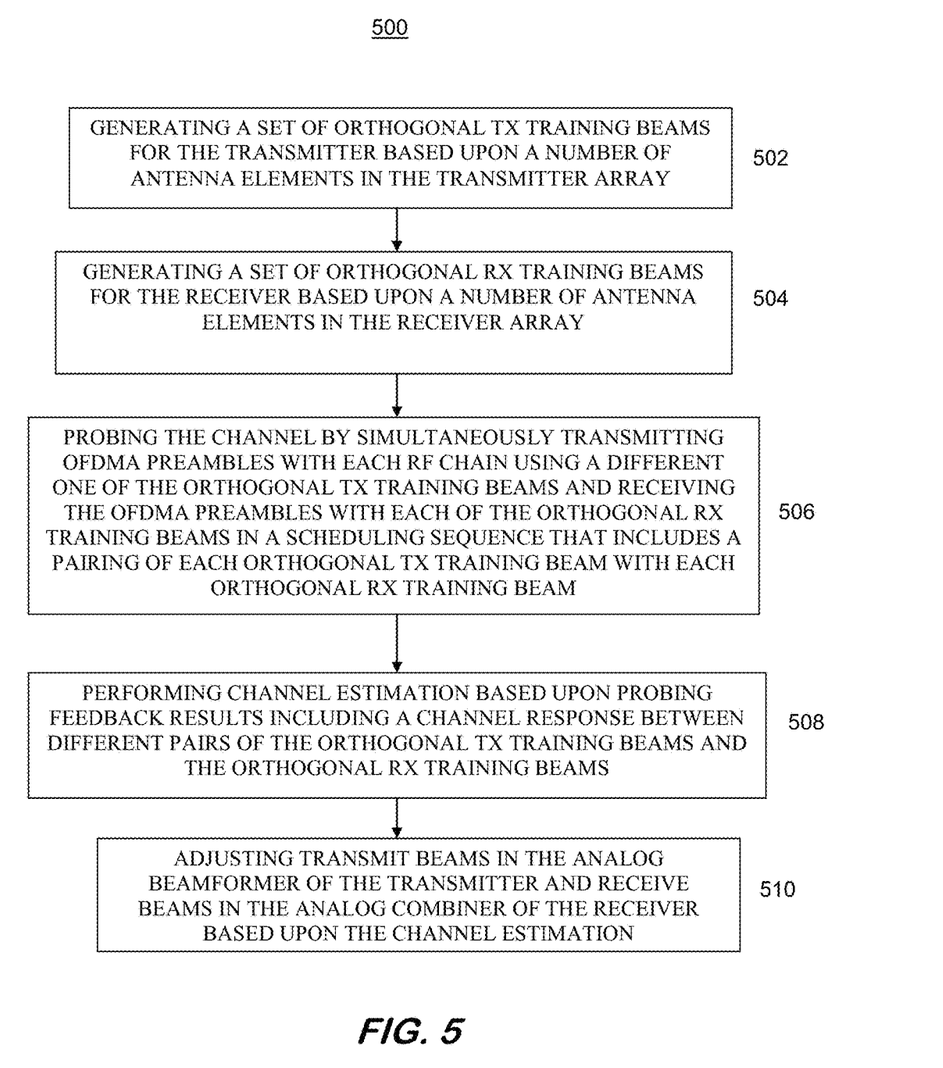
FIG. 5 is a flowchart illustrating various method operations according to representative embodiments.

So, in view of the above description, and with additional reference to FIG. 5, a present embodiment is directed to a method 500 of operating an OFDMA HBF system 130 wherein a transmitter Tx 132 and receiver Rx 134 communicate over a channel H and each include a plurality of RF chains 154, 174 and an array of antenna elements 136A-136N, 138A-138N corresponding to each RF chain, and wherein the transmitter Tx 132 includes an analog beamformer 156 and the receiver Rx 134 includes an analog combiner 176. The method includes generating 502 a set of orthogonal Tx training beams for the transmitter 132 based upon a number of antenna elements 136A-136N in the transmitter antenna array 136.

At 504, the method includes generating a set of orthogonal Rx training beams for the receiver Rx 134 based upon a number of antenna elements 138A-138N in the receiver antenna array 138. Then, at 506, the method proceeds with probing the channel H by simultaneously transmitting OFDMA preambles with each RF chain 154 using a different one of the orthogonal Tx training beams and receiving the OFDMA preambles with each of the orthogonal Rx training beams in a scheduling sequence that includes a pairing of each orthogonal Tx training beam with each orthogonal Rx training beam.

At 508, the method includes performing channel estimation based upon probing feedback results including a channel response between different pairs of the orthogonal Tx training beams and the orthogonal Rx training beams, and at 510 adjusting transmit beams in the analog beamformer 156 of the transmitter 132 and receive beams in the analog combiner 176 of the receiver 134 based upon the channel estimation.

Accordingly, the present embodiments provide a practical beam training approach for channel estimation in OFDMA-based HBF systems. A method of channel estimation is provided in an OFDMA HBF wireless communication system, and a method of operating an OFDMA HBF wireless communication system is also provided.

While embodiments of the invention have been illustrated and described in detail in the drawings and foregoing description, such illustration and description are to be considered illustrative or exemplary and not restrictive; the invention is not limited to the disclosed embodiments.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measured cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems, for example, as discussed above.

While representative embodiments are disclosed herein, one of ordinary skill in the art appreciates that many variations that are in accordance with the present teachings are possible and remain within the scope of the appended claim set. The invention therefore is not to be restricted except within the scope of the appended claims.

The invention claimed is:

1. A method for channel estimation with transmitter (Tx) and receiver (Rx) beam training in an Orthogonal Frequency Division Multiple Access (OFDMA) Hybrid BeamForming (HBF) system wherein the transmitter and receiver communicate over a channel and each include a plurality of Radio Frequency (RF) chains and an antenna array of antenna elements corresponding to each RF chain, and wherein the transmitter includes an analog beamformer and the receiver includes an analog combiner, the method comprising:
   generating a set of orthogonal Tx training beams for the transmitter based upon a number of antenna elements in the transmitter antenna array;
   generating a set of orthogonal Rx training beams for the receiver based upon a number of antenna elements in the receiver antenna array;
   probing the channel by simultaneously transmitting OFDMA preambles with each RF chain using a different one of the orthogonal Tx training beams and receiving the OFDMA preambles with each of the orthogonal Rx training beams in a scheduling sequence that includes a pairing of each orthogonal Tx training beam with each orthogonal Rx training beam; and
   performing channel estimation based upon probing feedback results including a channel response between different pairs of the orthogonal Tx training beams and the orthogonal Rx training beams.

2. The method of claim 1, wherein a number of orthogonal Tx training beams in the set corresponds to the number of antenna elements in the transmitter antenna array, and a number of orthogonal Rx training beams in the set corresponds to the number of antenna elements in the receiver antenna array.

3. The method of claim 2, wherein the set of orthogonal Tx training beams defines a Tx training beam matrix dimensioned based upon the number of antenna elements in the transmitter antenna array, and the set of orthogonal Rx training beams defines an Rx training beam matrix dimensioned based upon the number of antenna elements in the receiver antenna array.

4. The method of claim 3, wherein each column in the Tx training beam matrix corresponds to one of the Tx training beams, and a conjugate of each column in the Rx training beam matrix corresponds to one of the Rx training beams.

5. The method of claim 1, wherein simultaneously transmitting OFDMA preambles with each RF chain includes multiplexing the OFDMA preambles in the frequency domain.

6. The method of claim 1, wherein a number $N_{ofdm}$ of OFDMA preambles transmitted is based upon the number $N_t$ of antenna elements in the transmitter antenna array, a number $N_{trf}$ of RF chains in the transmitter, the number $N_r$ of antenna elements in the receiver antenna array, and a number $N_{rrf}$ of RF chains in the receiver according to the equation $N_{ofdm}=N_t/N_{trf}*N_r/N_{rrf}$.

7. The method of claim 1, wherein performing channel estimation based upon probing feedback results comprises obtaining channel estimations for each subcarrier of OFDMA transmission blocks.

8. The method of claim 1, wherein the OFDMA HBF system comprises a massive multiple input multiple output (MIMO) OFDMA HBF system.

9. The method of claim 8, wherein the transmitter and receiver of the MIMO OFDMA HBF system communicates using millimeter wave (mmWave) wireless communications.

10. A method of operating an Orthogonal Frequency Division Multiple Access (OFDMA) Hybrid BeamForming (HBF) system wherein a transmitter and receiver communicate over a channel and each include a plurality of Radio Frequency (RF) chains and an antenna array of antenna elements corresponding to each RF chain, and wherein the transmitter includes an analog beamformer and the receiver includes an analog combiner, the method comprising:
  generating a set of orthogonal Tx training beams for the transmitter based upon a number of antenna elements in the transmitter antenna array;
  generating a set of orthogonal Rx training beams for the receiver based upon a number of antenna elements in the receiver antenna array;
  probing the channel by simultaneously transmitting OFDMA preambles with each RF chain using a different one of the orthogonal Tx training beams and receiving the OFDMA preambles with each of the orthogonal Rx training beams in a scheduling sequence that includes a pairing of each orthogonal Tx training beam with each orthogonal Rx training beam;
  performing channel estimation based upon probing feedback results including a channel response between different pairs of the orthogonal Tx training beams and the orthogonal Rx training beams; and
  adjusting transmit beams in the analog beamformer of the transmitter and receive beams in the analog combiner of the receiver based upon the channel estimation.

11. The method of claim 10, wherein a number of orthogonal Tx training beams in the set corresponds to the number of antenna elements in the transmitter antenna array, and a number of orthogonal Rx training beams in the set corresponds to the number of antenna elements in the receiver antenna array.

12. The method of claim 11, wherein the set of orthogonal Tx training beams defines a Tx training beam matrix dimensioned based upon the number of antenna elements in the transmitter antenna array, and the set of orthogonal Rx training beams defines an Rx training beam matrix dimensioned based upon the number of antenna elements in the receiver antenna array.

13. The method of claim 12, wherein each column in the Tx training beam matrix corresponds to one of the Tx training beams, and a conjugate of each column in the Rx training beam matrix corresponds to one of the Rx training beams.

14. The method of claim 10, wherein simultaneously transmitting OFDMA preambles with each RF chain includes multiplexing the OFDMA preambles in the frequency domain.

15. The method of claim 10, wherein a number $N_{ofdm}$ of OFDMA preambles transmitted is based upon the number $N_t$ of antenna elements in the transmitter antenna array, a number $N_{trf}$ of RF chains in the transmitter, the number $N_r$ of antenna elements in the receiver antenna array, and a number $N_{rrf}$ of RF chains in the receiver according to the equation $N_{ofdm}=N_t/N_{trf}*N_r/N_{rrf}$.

16. The method of claim 10, wherein performing channel estimation based upon probing feedback results comprises obtaining channel estimations for each subcarrier of OFDMA transmission blocks.

17. A wireless communications device for operation in an Orthogonal Frequency Division Multiple Access (OFDMA) Hybrid BeamForming (HBF) system, the wireless communications device comprising:
  a transmitter including a digital precoder, a plurality of Radio Frequency (RF) chains, an analog beamformer and an array of antenna elements corresponding to each RF chain, and configured to communicate over a channel with a receiver that includes a plurality of RF chains, an antenna array of antenna elements corresponding to each RF chain, an analog combiner and a digital decoder; and
  a controller including one or more integrated circuit devices configured to
    generate a set of orthogonal Tx training beams for the transmitter based upon a number of antenna elements in the transmitter antenna array for reception at the receiver via a set of orthogonal Rx training beams that are based upon a number of antenna elements in the receiver antenna array,
    probe the channel by controlling the transmitter to simultaneously transmit OFDMA preambles with each RF chain using a different one of the orthogonal Tx training beams for reception of the OFDMA preambles with each of the orthogonal Rx training beams in a scheduling sequence that includes a pairing of each orthogonal Tx training beam with each orthogonal Rx training beam, and
    adjust transmit beams in the analog beamformer of the transmitter in view of channel estimation information from the receiver based upon probing feedback results including a channel response between different pairs of the orthogonal Tx training beams and the orthogonal Rx training beams.

18. The wireless communications device of claim 17, wherein a number of orthogonal Tx training beams in the set corresponds to the number of antenna elements in the transmitter antenna array, and a number of orthogonal Rx training beams in the set corresponds to the number of antenna elements in the receiver antenna array.

19. The wireless communications device of claim 18, wherein the set of orthogonal Tx training beams defines a Tx training beam matrix dimensioned based upon the number of antenna elements in the transmitter antenna array, and the set of orthogonal Rx training beams defines an Rx training beam matrix dimensioned based upon the number of antenna elements in the receiver antenna array.

20. The wireless communications device of claim 19, wherein each column in the Tx training beam matrix corresponds to one of the Tx training beams, and a conjugate of each column in the Rx training beam matrix corresponds to one of the Rx training beams.

21. The wireless communications device of claim 17, wherein the controller is configured to simultaneously transmit OFDMA preambles with each RF chain including multiplexing the OFDMA preambles in the frequency domain.

22. The wireless communications device of claim 17, wherein a number $N_{ofdm}$ of OFDMA preambles transmitted is based upon the number $N_t$ of antenna elements in the transmitter antenna array, a number $N_{trf}$ of RF chains in the transmitter, the number $N_r$ of antenna elements in the receiver antenna array, and a number $N_{rrf}$ of RF chains in the receiver according to the equation $N_{ofdm}=N_t/N_{trf}*N_r/N_{rrf}$.

* * * * *